May 10, 1932. G. A. MOORE 1,857,209
TOY ELECTRIC MOTOR
Filed March 2, 1932

Inventor
George A. Moore
by Wright Brown Quinby & May
Attys.

Patented May 10, 1932

1,857,209

UNITED STATES PATENT OFFICE

GEORGE A. MOORE, OF BOSTON, MASSACHUSETTS

TOY ELECTRIC MOTOR

Application filed March 2, 1932. Serial No. 596,291.

This invention relates to an electric motor which includes a field magnet and a shaft, the latter having an armature including a wire winding, and a commutator including the ends of the armature winding, and wire brushes cooperating with the commutator.

One object of the invention is to provide a set of toy motor parts of such nature that they may be assembled, without the use of tools, by a young person of little or no mechanical experience, to constitute an operative motor, said parts being adapted to be packaged without being assembled, so that a purchaser may operatively assemble the parts by following directions accompanying the package, and thus acquire useful knowledge and find interesting employment.

Other objects will hereinafter appear.

Of the accompanying drawings forming a part of this specification,—

The same reference characters indicate the same parts in all of the figures.

Figure 1:
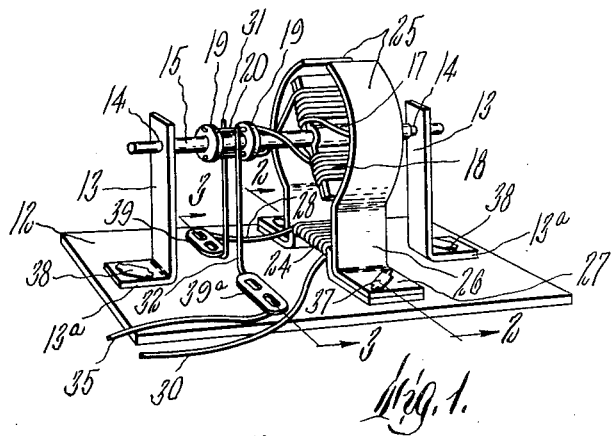
Figure 1 is a perspective view of a toy motor embodying the invention.

In the drawings 12 designates an insulating base which may be of thick paper or pasteboard and constitutes the cover of a box. Seated on the base are bearings including standards 13 having feet 13ª, and orifices 14 in which is journalled a shaft 15 carrying an armature and a commutator.

The armature includes a body preferably composed of sections 16 having recessed portions 17, bearing on the shaft, and a flexible wire winding 18 connecting the sections with each other, the armature being adapted to be built wholly by the operation of applying the sections 16 to the shaft and forming the winding 18.

The commutator includes two heads or disks 19 of insulating material having central holes in which the shaft 15 has a close frictional fit, the disks being spaced apart on the shaft, and wire members 20 formed by end portions of the armature winding and inserted in other holes formed in the heads, the members 20 being parallel with and spaced from the shaft 15. The commutator is adapted to be built wholly by the operation of assembling the parts thereof as described.

The field magnet of the motor includes a core bent so that it has a central portion 21, feet sections 22 bearing on the base, and intermediate shoulders 23. A field coil 24 of flexible wire is wound on the central portion 21 of the core, and confined thereon by the shoulders 23, the form of the core being such that it may be conveniently wound like a spool.

The field magnet includes also pole pieces 25 partly surrounding the shaft and armature, and seated on the end portions of the core. Said pole pieces are provided with extensions forming necks or standards 26 bearing on the core shoulders 23, and feet sections 27, seated on the core feet sections 22.

The field coil 24 has an end extension 28 constituting a conductor connected with one of the commutator brushes hereinafter described, and provided with a fastener receiving loop 29, (Figure 6), seated on the base, and another end extension 30 constituting a lead wire engageable with a battery terminal.

35 designates a lead wire having at one end a loop or eye 36 (Figure 7) seated on the base, and connected with another commutator brush, the opposite end of said wire being engageable with another battery terminal.

Associated with the commutator are two resilient fingers constituting commutator brushes. Each finger has a conducting foot located on the base, said finger upstanding from the foot. Each foot is adapted, when secured to the base, as hereinafter described, to maintain the accompanying finger in a vertical position beside the commutator. The conducting fingers are relatively stiff, or in other words stiffer than the wire of the wire elements above described, (which are relatively flexible to permit convenient winding), so that said fingers are not liable to be accidentally bent into short circuiting contact with the shaft 15, the fingers being at the same time sufficiently resilient to enable them to be flexed outwardly by the commutator members 20, and then spring inwardly to the position shown by Figure 3.

Figures 1, 3, 4 and 5 show a suitable form of the brush fingers and portions of the feet thereof. Another form of the brush fingers and the feet thereof is shown by Figures 9 and 10.

Figures 4, 5, 6, 7:
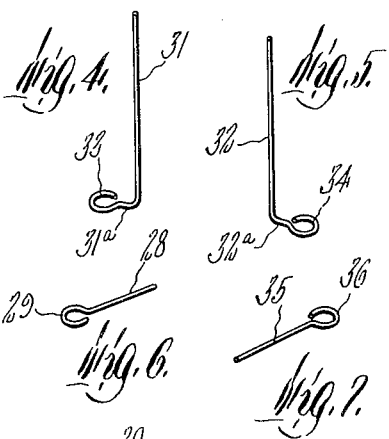
Figures 4 and 5 are perspective views showing the commutator brushes shown by Figures 1 and 3, and portions of the feet thereof.
Figure 6 is a fragmentary perspective view showing a portion of one of the conducting extensions of the field coil or core winding of the field magnet.
Figure 7 is a fragmentary perspective view showing a portion of the looped lead wire hereinafter described.

In Figures 1, 3, 4 and 5, 31 and 32 designate the brush fingers which are made of relatively hard and stiff wire, each being of the angular form shown by Figures 4 and 5. The lower end 31ª of the wire which includes the finger 31 is bent at an angle with the finger and constitutes a portion of the foot, and is provided with a loop or eye 33. The lower end 32ª of the wire which includes the finger 32 also constitutes a foot portion, and is provided with a loop or eye 34. The brush feet are completed by thin conducting plates 39 and 39ª, preferably of copper, separately formed and seated on the loops 33 and 34, and adapted to be secured to the base by fasteners hereinafter described, formed on said plates.

The plate 39 bears on the loop 29 of the field coil end or conductor 28, and the plate 39ª bears on the loop 36 of the lead wire 35.

Figure 9:
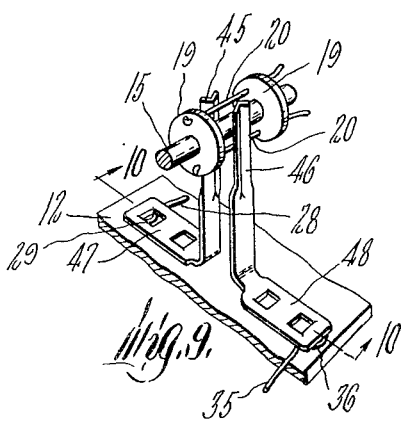
Figure 9 is a view similar to a portion of Figure 1 showing a modification.
Figure 10:
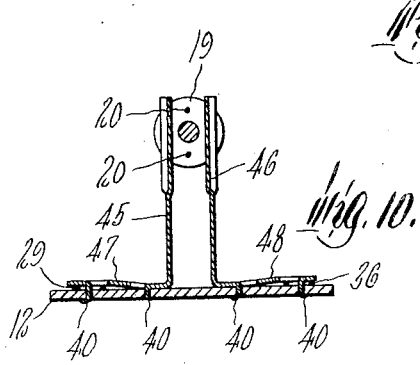
Figure 10 is a section on line 10—10 of Figure 9.

The finger and foot of each of the brushes shown by Figures 9 and 10 is made in one piece of hardened sheet copper, the fingers being designated by 45 and 46. The feet, which are integral with the fingers and constitute conductors, are designated by 47 and 48, the upper portions of the fingers being preferably channeled longitudinally to increase their stiffness. In each case the feet are arranged at an angle to the fingers so that when the feet are attached to the base, the fingers upstand therefrom as shown.

Figure 2:
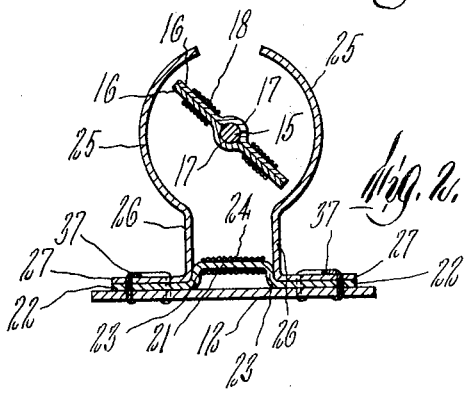
Figure 2 is a section on the plane indicated by line 2—2 of Figure 1.

Staple shaped fasteners 37—37 secure the field magnet core and the pole pieces to each other and to the base. The prongs of said fasteners are flexible and pass through orifices in the feet sections 22 and 27, and are clinched on the under side of the base, as shown by Figure 2. Similar fasteners 38—38 secure the standards 13 to the base, the prongs of said fasteners passing through orifices in the standard feet 13ª. The conducting portions 39 and 39ª of the brush feet are provided with integral downwardly projecting prongs 40 constituting fasteners which secure the brushes to the base. One of the prongs of the conducting plate 39 passes through the foot loop 33. The other prong of the plate 39 passes through the loop 29 of the wire extension 28, said loop being interposed between the neck 39 and the base.

One of the prongs of the plate 39ª passes through the foot loop 34, and the other prong through the loop 36 of the conductor 35. The plates 47 and 48 shown by Figures 9 and 10 are provided with prongs 40 functioning as shown by Figure 10.

Figure 3:
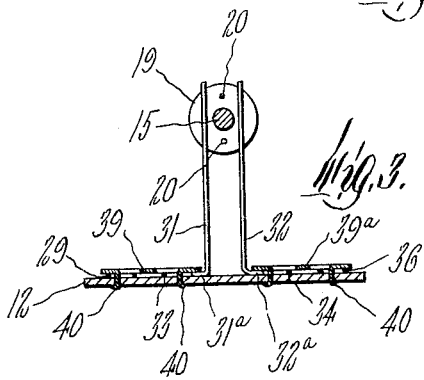
Figure 3 is a section on the plane indicated by line 3—3 of Figure 1.

It will be seen that the described brush feet securely confine the fingers 31—32 to the base, so that they upstand therefrom, and also electrically connect said fingers with the conductors 28 and 35. The brush construction in each case permits the employment for the brush fingers of relatively hard and resilient metal not liable to be accidentally bent into short circuiting contact with the shaft, the brush fingers contacting only with the wire members 20 of the commutator when the motor is running. The brushes are adjusted as shown by Figure 3, so that they are spaced from the shaft.

The base is provided with means indicating the predetermined positions of the several fasteners required to locate the parts secured thereby in operative relation to each other. Said means may include orifices of any desired form in which the fastener prongs may be inserted preparatory to being clinched on the inner side of the base. Dots or other marks may be provided for the same purpose in case the base is easily penetrable by said prongs.

Figure 8:
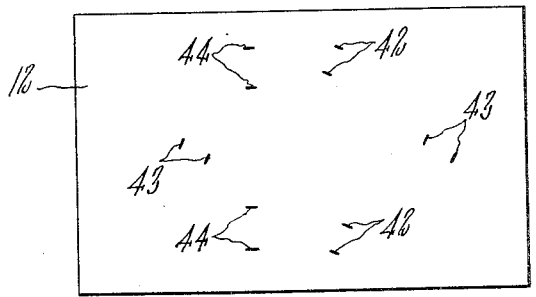
Figure 8 is a top plan view of the base as it appears before the motor parts are installed thereon.

In Figure 8, 42 designates orifices arranged to receive the prongs of the fasteners 37 which secure the field pole feet 27 and the core feet 22 to each other and to the base. 43 designate orifices arranged to receive the prongs of the fasteners 38 which secure the feet of the standards 13 to the base. 44 designates orifices arranged to receive the prongs 40 which secure the feet of the brush fingers to the base. Said orifices are arranged in pairs and are preferably slits punched in the base.

The two spaced apart commutator heads 19 hold the wire ends of members 20 parallel with the shaft 15 and spaced therefrom, and thereby prevent short circuiting contact of the said members with the shaft.

The described parts before they are assembled constitute an educational outfit. The wire from which the core and armature windings and their terminals are formed constitutes a part of the outfit, and may be installed by the operator according to the directions furnished.

The described parts including the base and means such as a box confining the parts compactly gathered, constitute a package adapted to be marketed as an article of merchandise. The wire for the several relatively flexible wire parts above mentioned may be coiled and inserted with the other parts in the box. The directions may inform a purchaser of the package how long to cut each length of wire.

It is obvious that the base 12 may be made separately from the box and packed with the other parts in the box.

The parts may be assembled to form an operative motor, as next described.

A suitable length of wire for the field coil 24 and extensions 28 and 30 is cut from a supply coil, and a portion of it is wound on the core to form the coil 24, the described form of the core permitting convenient winding. The angular extensions of the field poles 25 are then placed upon the feet 22 and shoulders 23 of the core, and the fasteners 37 are inserted to secure the core and field poles to the base, the wire end portions 28 and 30 of the winding 24 being left projecting from the winding.

The sections 16 of the armature body are next placed on the shaft 15 and the winding 18 is applied and secures said sections to the shaft. The end portions 20 of the armature winding are then inserted in the inner insulating head 19, and said head is forced onto the shaft to a suitable distance from the armature. The end portions 20 are then inserted in the outer insulating head 19 which is forced onto the shaft up to about a quarter of an inch of the inner head. The right hand standard 13 (Figure 1) is next secured to the base by one of the fasteners 38, and the armature end of the shaft is inserted in the bearing of said standard. The left hand standard 13 is then applied to the opposite end of the shaft and fastened to the base by the other fastener 38.

The brushes and the loops of the conductors 28 and 35 are then secured to the base by the brush feet prongs 40, as already described.

After the described assemblage the wire portions 30 and 35, which may be of any suitable length, are connected with the terminals of a dry cell battery.

It will be seen that the invention is embodied in a toy motor having several novel features which make it possible for a novice to assemble the parts and thus obtain an insight into motor construction and learn why a motor works.

The parts of the commutator, the armature and the field magnet are adapted to be fastened together by interengagement with each other without the use of rivets, nuts or screws.

To assist the novice, the base to which the various parts are fastened is perforated or otherwise marked.

The separability of the parts of the field magnet permits ease of wiring, and the extensions of the core and pole pieces that fit together to make the field are of sufficient area to prevent loss of magnetism.

The fastening of the feet of the field magnet and the shaft bearings by staple shaped fasteners having necks bearing on the feet, and flexible prongs inserted in spaced apart holes in the feet, and clinched on the under side of the base, insures stability of the parts supported by said feet.

The copper conducting plates 39—39ª or 47, 48, each provided with a pair of flexible prongs, are an aid to easy assembling of the lead wires and brush fingers.

The two insulating commutator disks 19 are preferable to one disk because they keep the wires 20 and the brush fingers in the proper relation to the armature shaft.

This application is a continuation in part of my application Serial No. 567,363 filed October 7, 1931.

I claim:

1. A toy electric motor comprising motor elements including a field magnet, a rotary armature having a shaft, bearings for said shaft, a commutator on the shaft, and a pair of commutator brushes, said magnet, bearings, and brushes having feet, a base supporting said feet and having indicating means showing the required relative positions of the feet thereon, and fasteners securing said feet to the base, said indicating means showing the required location of said fasteners and feet, and enabling said elements to be assembled by a novice in building the motor.

2. A toy electric motor comprising motor elements including a field magnet, a rotary armature having a shaft, bearings for said shaft, a commutator on the shaft, and a pair of commutator brushes, said magnet, bearings, and brushes having feet, and fasteners securing said feet to the base, said fasteners including flexible prongs arranged in pairs, the base having pairs of orifices formed to receive said prongs and arranged to constitute means indicating the required location of the fasteners and of the feet secured thereby.

3. A toy electric motor as specified by claim 1, said field magnet including a core having feet seated on the base, a wire winding on the core forming a field coil and pole pieces partly surrounding the armature and having feet seated on the core feet, said core and pole piece feet collectively constituting the feet of the field magnet, said feet having pairs of fastener receiving orifices, the fasteners of said feet being staple shaped and including necks adapted to bear on the feet, and flexible prongs adapted to enter said orifices and be clinched on the under side of the base.

4. A toy electric motor as specified by claim 1, said field magnet including a core having a field coil, said core being bent to provide it with a raised central portion on which the field coil is wound, and shoulders connecting the central portion with feet on the core and confining the winding on said central portion, so that the core is adapted to be conveniently wound.

5. A toy electric motor as specified by claim 1, said brushes being composed of resilient conducting fingers having feet arranged at an angle to the fingers, said feet including conducting plates electrically connected with the fingers and having pairs of flexible prongs adapted to pass through the base and be clinched on the under side thereof, said feet when attached to the base by said prongs maintaining the fingers in normally vertical positions beside the commutator, the foot of one of said brushes being confined by one of said prongs in conducting contact with a loop on one end of the field magnet core winding, the foot of the other brush being confined by another of said prongs in conducting contact with a loop on a lead wire.

6. A toy electric motor comprising a base, a field magnet including a core having feet bearing on the base, a wire winding on said core, and field poles bearing on the core feet, an end portion of the core winding being a conductor, standards bearing on the base, a shaft journalled in said standards, an armature fixed to the shaft and including a wire winding, a commutator mounted on the shaft and including the ends of the armature winding, wire commutator brushes each having a foot bearing on the base, one brush being connected with the winding of the field magnet core by said conductor, a lead wire connected with the other brush, fasteners securing the field magnet to the base and the field poles to the feet of the field magnet core, fasteners securing said standards to the base, and fasteners securing the brush feet to the base, said base having means indicating the location of said fasteners required to operatively locate the parts secured thereby on the base, said indicating means enabling a novice to properly assemble the parts of the motor.

In testimony whereof I have affixed my signature.

GEORGE A. MOORE.